United States Patent [19]

Parkhurst et al.

[11] Patent Number: 4,853,877
[45] Date of Patent: Aug. 1, 1989

[54] APPARATUS AND METHOD FOR EFFICIENT PLOTTING

[75] Inventors: Anthony D. Parkhurst, Oceanside; Thomas J. Halpenny, Escondido, both of Calif.

[73] Assignee: Hewlett-Packard Company, Palo Alto, Calif.

[21] Appl. No.: 266,333

[22] Filed: Nov. 1, 1988

Related U.S. Application Data

[63] Continuation of Ser. No. 854,217, Apr. 21, 1986, abandoned.

[51] Int. Cl.$^4$ .............................................. G05B 19/19
[52] U.S. Cl. ............................... 364/520; 346/139 R; 346/51
[58] Field of Search .......................... 364/520; 178/96; 346/51, 52, 33 MC, 139 R

[56] References Cited

U.S. PATENT DOCUMENTS

| | | | |
|---|---|---|---|
| 4,135,245 | 1/1979 | Kemplin et al. | 364/520 |
| 4,510,568 | 4/1985 | Kishi et al. | 364/300 |
| 4,573,129 | 2/1986 | Tribolet et al. | 364/520 |
| 4,677,572 | 6/1987 | Gunderson et al. | 364/520 |

OTHER PUBLICATIONS

"CalComp Unveils New Advanced Models", 9/13/85, Anaheim, CA News Release, Calcomp: A Sanders Co.
"CalComp Plotters: The 1040 GT Series . . . ", 1988, Order No. 60809-DLR Calcomp Inc.
"CalComp Pen Plotters", 1988, Calcomp: A Lockheed Co., Anaheim, CA.

Primary Examiner—Gary V. Harkcom
Assistant Examiner—Mark K. Zimmerman
Attorney, Agent, or Firm—Douglas A. Kundrat

[57] ABSTRACT

A plotter continuously performs a dynamic sort on incoming vectors to be plotted and stores the sorted vectors by color in bins within a memory. At the same time that the sort is being performed, the plotter selects the bin containing the most vectors and plots all of the vectors from that bin before selecting another bin.

18 Claims, 8 Drawing Sheets

APPARATUS AND METHOD FOR EFFICIENT PLOTTING

CROSS REFERENCE TO RELATED APPLICATION

This application is a continuation of application Ser. No. 854,217, filed 4/21/86, now abandoned.

BACKGROUND AND SUMMARY OF THE INVENTION

Modern high speed plotters operate under computer control to plot variously colored vectors onto sheets of recording medium. Typically, the host computer provides to the plotter a long string of vectors to be plotted and also provides commands to raise or lower the pen carriage and to select a pen of a certain color from among a set of available pens. The available pens may be carried on the pen carriage, as in the Calcomp Co. model 965 plotter, or may be stored in an accessible pen carousel as in the Hewlett-Packard Co. model HP 7585 plotter.

Attempts have been made in the prior art to optimize the string of vectors before transmission to the plotter. For example, the GrafTek Co. Optplot routine performs a complete sort by color of all of the vectors to be plotted before any vector is transmitted to the plotter. Such a routine requires a large host computer with extensive memory which is often not available for many plotting applications. In addition, improvements in plotting speed due to the optimization are at least partially offset by the additional time required to finish the complete vector sort before any vector is transmitted to the plotter for plotting.

The present inventors have discovered that a large portion of the time spent plotting is actually taken up by pen changes rather than by vector plotting. The applicants have determined that a typical pen change takes on the order of one second to complete while a typical vector can be plotted in approximately ten milliseconds. The inventors have further noted that plotting efficiency decreases dramatically as pen changes occur more frequently than once for each approximately one thousand vector plots.

In accordance with the illustrated preferred embodiment of the present invention, a plotter continuously performs a dynamic sort on incoming vectors and stores the vectors by color in linked memory locations. At the same time that the incoming dynamic sort is occuring, the plotter determines the color having the most stored vectors and plots all of the stored vectors of that color before selecting the next color to be plotted. Thus, the plotter simultaneously sorts and plots the incoming vectors so that the number of pen changes is reduced and plotting efficiency is increased without requiring an unproductive sorting period before actual plotting begins.

DETAILED DESCRIPTION OF THE PREFERRED EMBODIMENT

Figure 1:
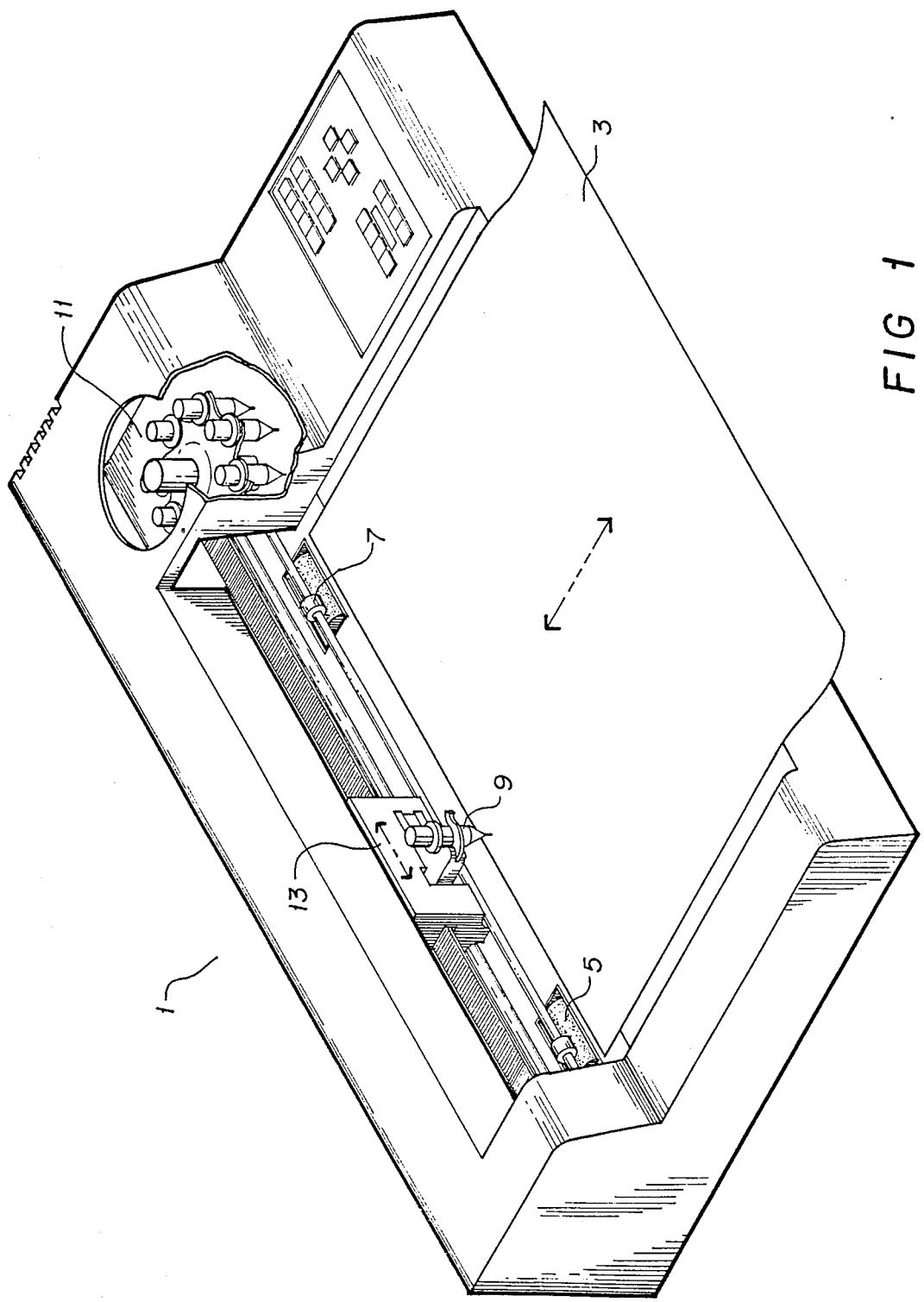
FIG. 1 shows a plotter which is constructed in accordance with the preferred embodiment of the present invention.

FIG. 1 shows a plotter 1 which is constructed in accordance with the preferred embodiment of the present invention. A sheet 3 may be moved in a forward or reverse X-direction by operation of wheel pairs 5, 7 using well known grit and pinch wheels of the type used in the Hewlett-Packard Co. model HP 7585 plotter. A pen carriage 13 moves a pen 9 in a Y-direction. A pen carousel 11 contains up to eight pens which may be selected by the carriage 13 in a pen change operation.

Figure 2:
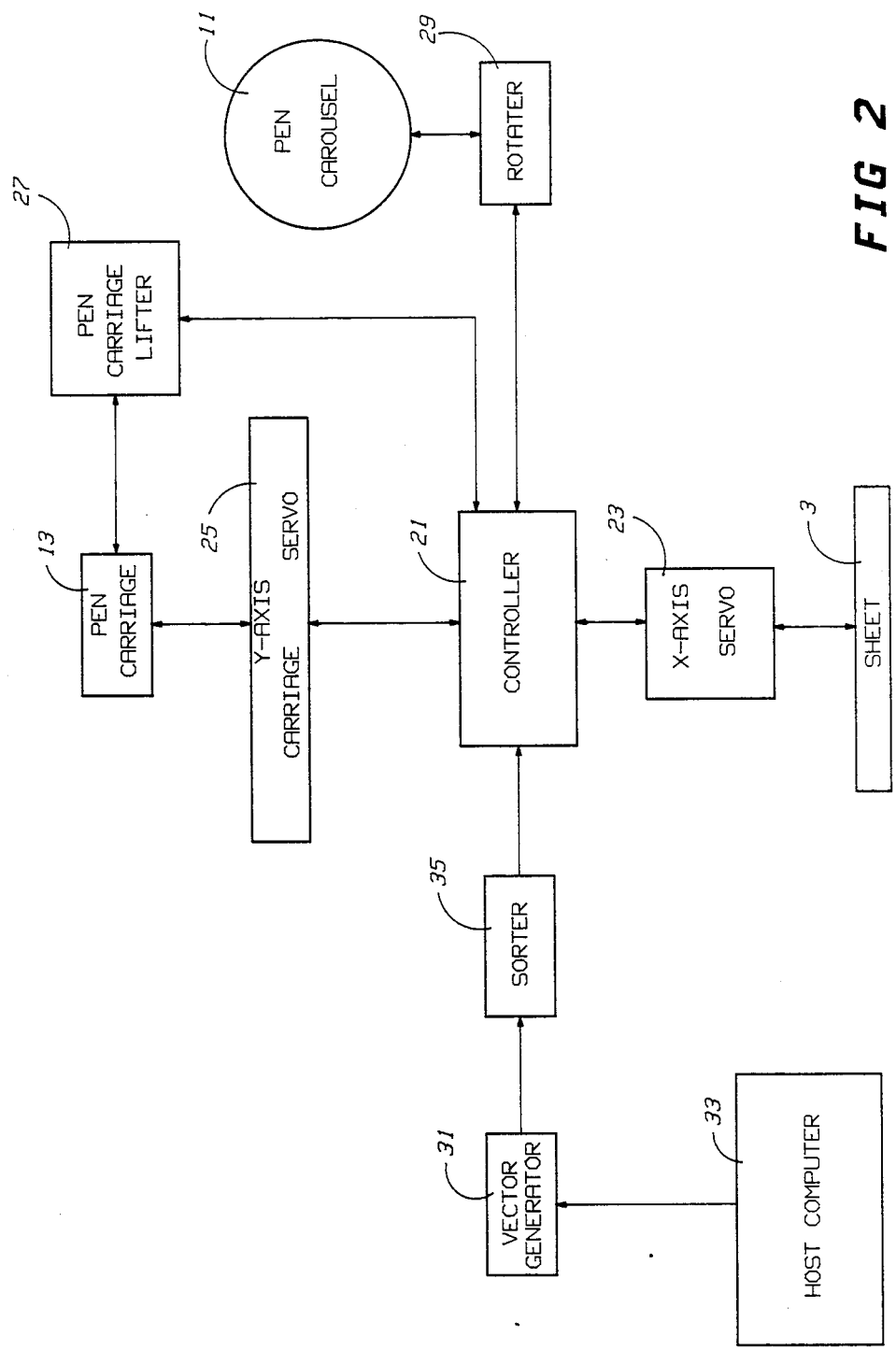
FIG. 2 is a block diagram of the plotter shown in FIG. 1.

FIG. 2 is a block diagram of the plotter 1 shown in Figure 1. A controller 21 actuates a lifter 27 and a Y-axis servo 25 to raise and lower the carriage 13 and to move the carriage 13 back and forth across the sheet 3. The controller 21 also activates a rotater 29 to rotate the carousel 11 as needed to allow the carriage 13 to select a particulr pen. A vector generator 31 receives commands from a host computer 33 and generates vectors for use by the controller 21 in plotting on the sheet 3. The elements 5–31 of the plotter 1 are well known and may comprise, e.g., elements used in the Hewlett-Packard Company model HP 7585 plotter.

In operation, a host computer 33, such as a Hewlett-Packard Company model HP 3000 computer using DSG-3000 software, transmits commands in a graphics language to the plotter 1. Typical of such languages is the Hewlett-Packard Company graphics language, HP-GL. HP-GL uses various commands including Pen Up (PU), Pen Down (PD), SELECT PEN n (SP-n) from among the eight pens A–H available in the carousel 11 and the command Plot Absolute (PA–XY) to move the carriage 11 to an X,Y position. The vector generator 31 receives these commands and generates a string of vectors and commands in the same manner as the vector generator of the Hewlett-Packard company model HP 7585 plotter. The vector generator 31 generates 40 bit vectors comprising 16 bits of X information and 16 bits of Y information followed by 7 zero bits and a one bit field indicating a pen up or down condition for the vector. The vector generator 31 intersperses SELECT PEN and other commands between vectors as necessary.

By way of example, the computer 33 could send the following string of commands to the plotter 1 in order to draw a red vector (pen A) from point $X_1,Y_1$ to point $X_2,Y_2$ and a black vector (pen B) from point $X_3,Y_3$ to point $X_4,Y_4$ on the sheet 3:

SP-A
PA-$X_1Y_1$
PD
PA-$X_2Y_2$
SP-B
PU
PA-$X_3Y_3$
PD
PA-$X_4Y_4$

Using the 40-bit vectors and the SELECT PEN command, the vector generator 31 would then generate then generate the following string:

| | SELECT PEN, A | | |
|---|---|---|---|
| (X₁), | (Y₁), | (0), | (U) |
| (X₂), | (Y₂), | (0), | (D) |
| | SELECT PEN, B | | |
| (X₃), | (Y₃), | (0), | (U) |
| (Y₄), | (Y₄), | (0), | (D) | which would be sorted by the sorter 35 and would be used by the controller 21 to plot the vectors on the sheet 3.

Figure 3:
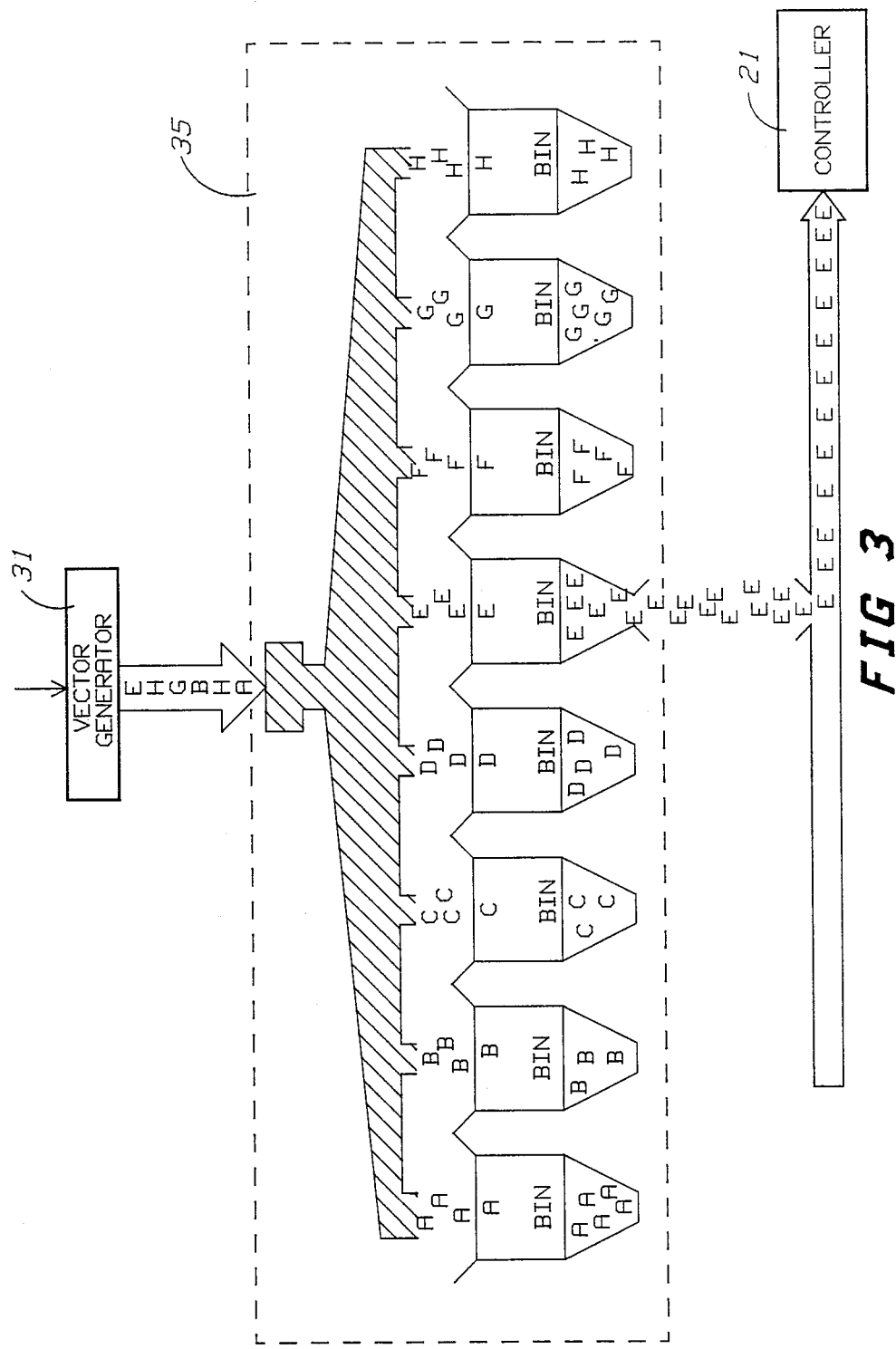
FIG. 3 is a pictorial representation of the continuous dynamic sort performed by the plotter shown in FIG. 1.

FIG. 3 is a pictorial representation of the operation of the sorter 35. The sorter 35 operates continuously to perform a dynamic sort on the vectors generated by the vector generator 31 from the commands received from the host computer 33. No optimization or sorting by the computer 33 is necessary. The vector generator 31 generates vector strings separated by SELECT PEN commands which indicate that the desired color of the plotted vector is to change. Thus, the vectors between SELECT PEN commands are all of the same color. As shown in FIG. 3, the output of the vector generator 31 my be characterized pictorially as a string of different colored vectors (A-H) with no interspersed commands.

The sorter 35 stores the individual vectors in eight separate bins A-H depending upon on color and determines which bin to open to the controller 21. The sorter 35 may be viewed as a continuous flow device with vectors flowing in from the vector generator 31 at the same time that vectors flow out to the controller 21. In the event that the sorter 35 provides input to the controller 21 faster than actual plotting can occur, the output stream of the sorter 35 will be interrupted until the controller 21 is ready for more vectors. When the output stream of the sorter 35 is interrupted, the input stream into the sorter 35 is still active until buffer 51 is full. In the event that the buffer 51 is full, the input stream to the sorter 35 is interrupted until the controller 21 re-activates the output stream of the sorter 35.

Figure 4:
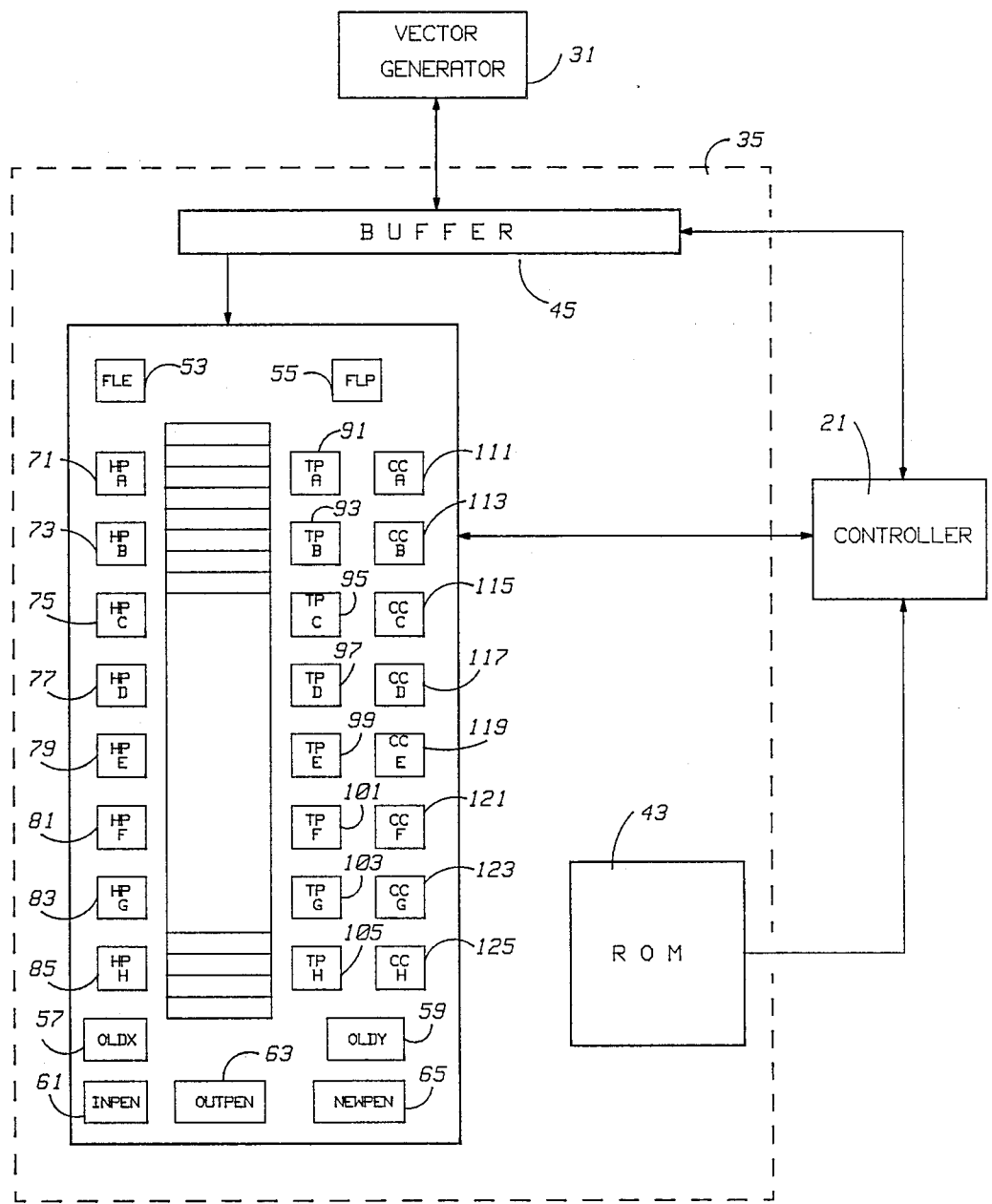
FIG. 4 is a block diagram of the sorter shown in FIG. 2.

FIG. 4 is a block diagram of the sorter 35 which contains a ROM 43, a RAM 47 and a buffer 45. The one kilobyte ROM 43 contains program information for use by the controller 21 in implementing the dynamic sort. The RAM 47, which may be from 2 to 32 kilobytes long as required, contains: a two byte wide buffer 51; free list pointers FLP 55 and FLE 53; registers OLDX 57, OLDY 59, INPEN 61, OUTPEN 63 and NEWPEN 65; head pointers HP-A 71 through HP-H 85 and tail pointers TP-A 91 through TP-H 105; and, color counters CC-A 111 through CC-H 125.

Figure 5:
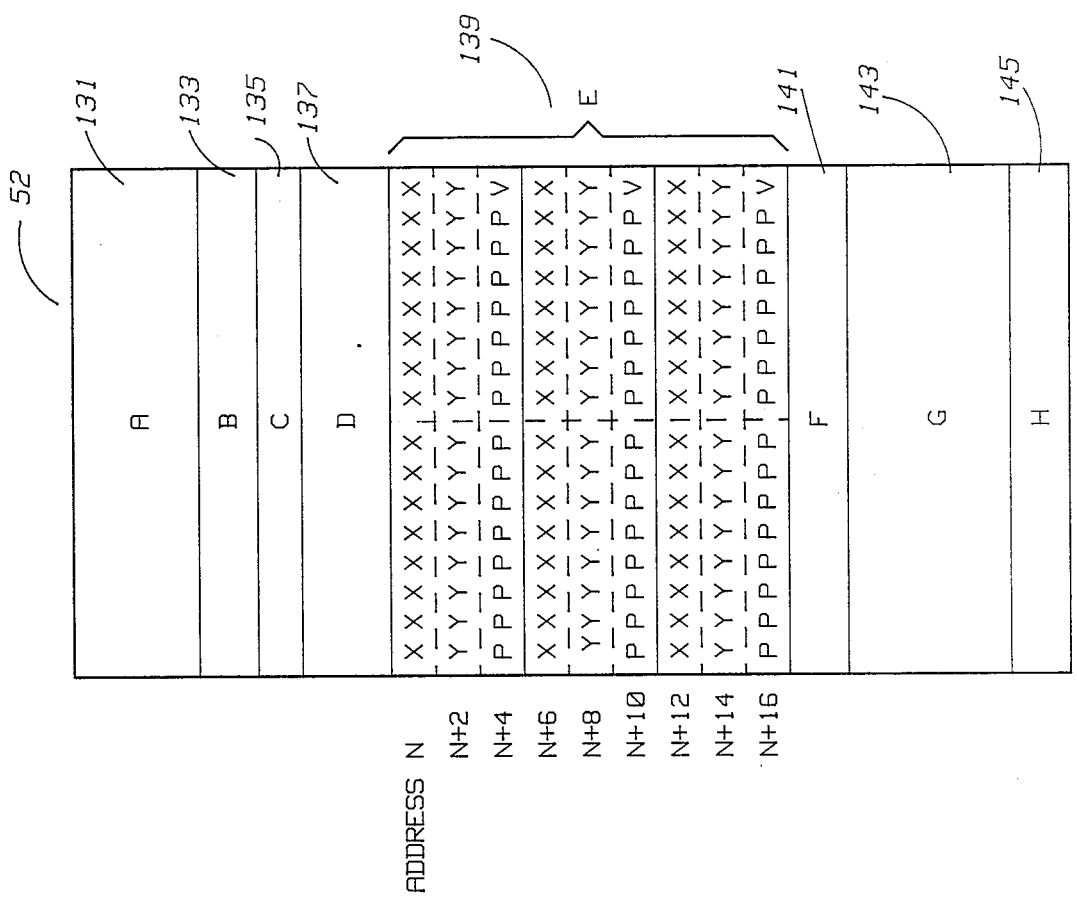
FIG. 5 shows a portion of the memory shown in FIG. 4.

FIG. 5 shows the two byte wide buffer 51 in detail. Since the plotter 1 is capable of plotting in eight colors, A-H, the buffer 51 is capable of storing vectors in eight separate A-H bins 131-145. For the most efficient use of space within the buffer 51, the individual bins 131-145 each comprise linked lists with bin size determined by actual requirements. Each stored vector is stored in a six byte vector location. Within each location a two byte X field contains a vector X coordinate and a two byte Y field contains a vector Y coordinate. A 15-bit P field contains the address of the next location in the particular bin's linked list. Finally, a one bit V field indicates whether the stored vector is to be executed with the pen carriage 27 in either an up or a down position.

Figure 6:
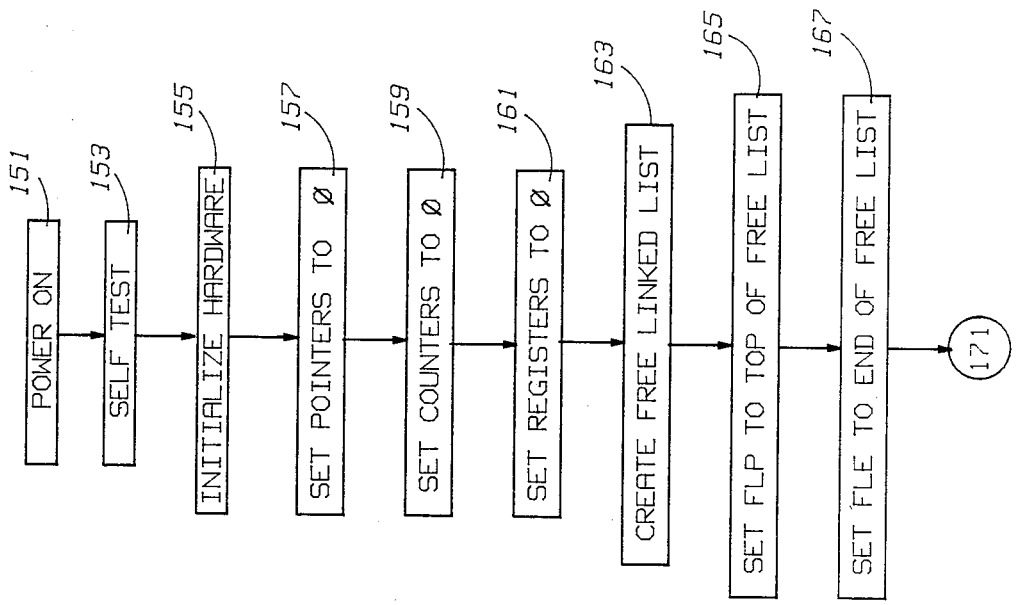
FIG. 6–8 are flow charts of various steps performed during plotting by the plotter shown in FIG. 1.
Figure 7:
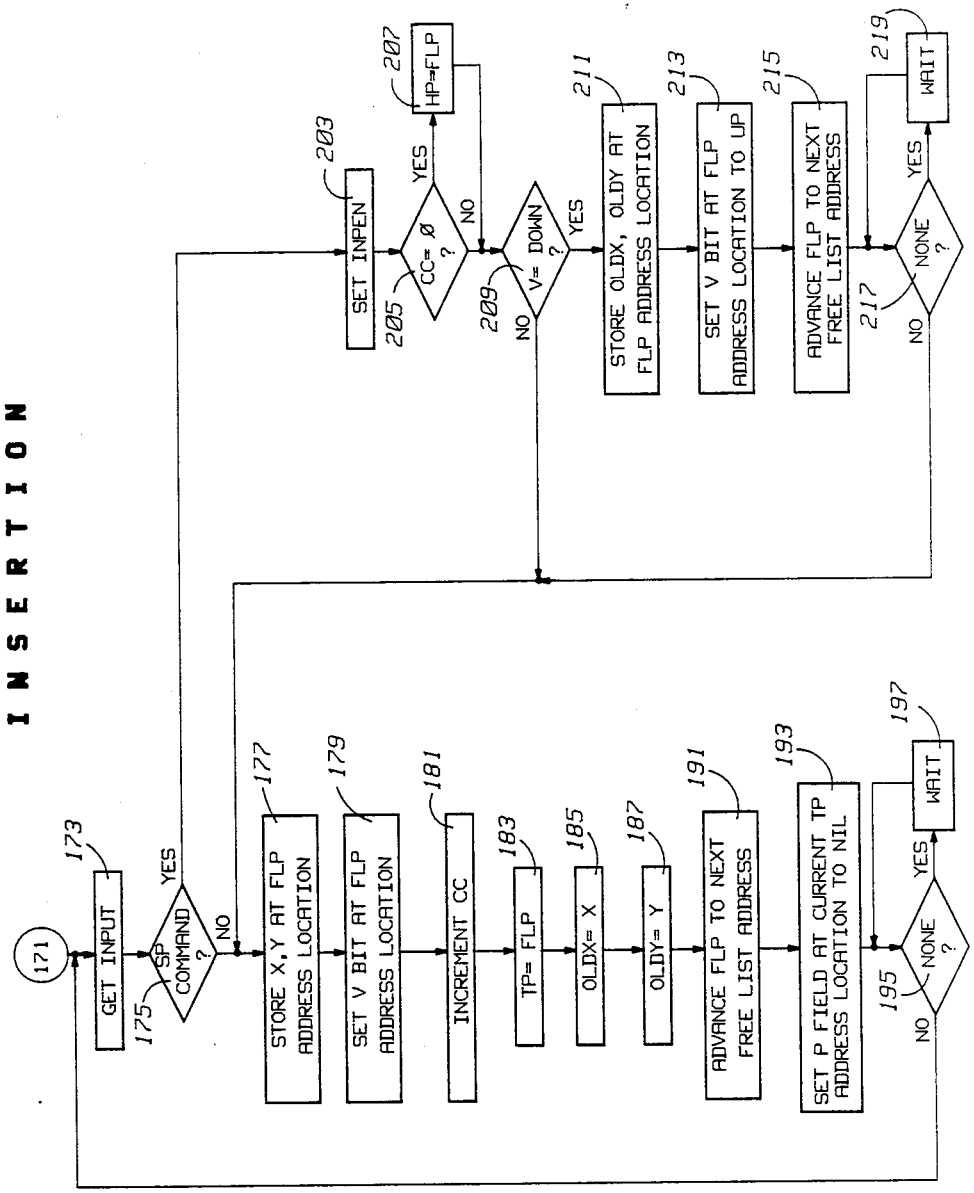
Figure 8:
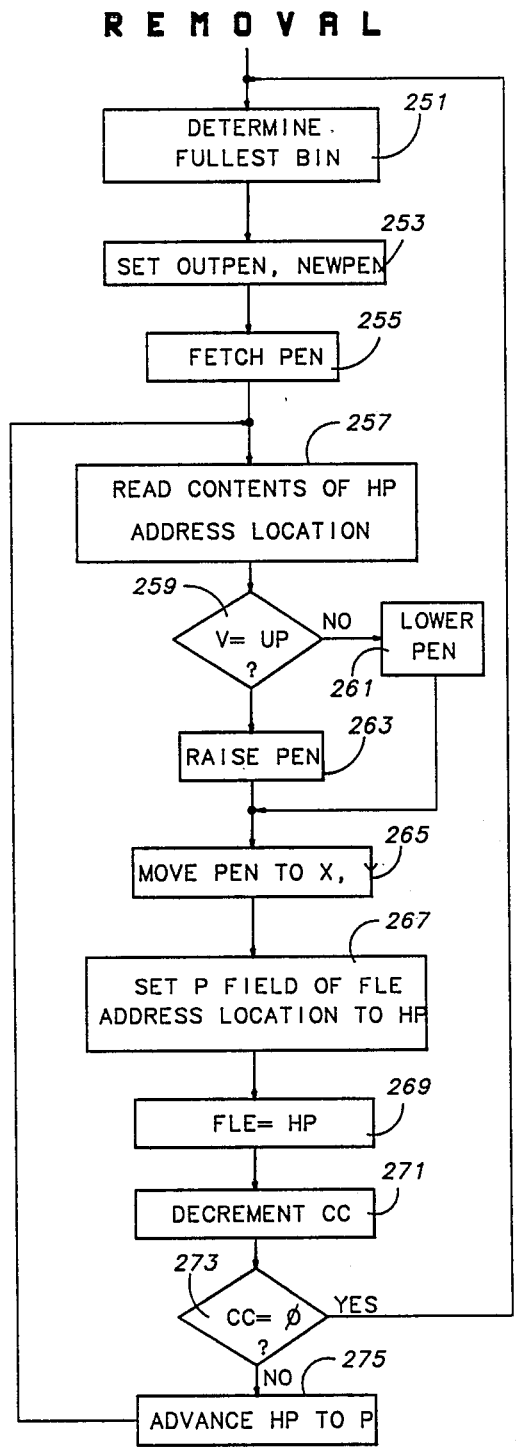

FIGS. 6-8 are flow charts of initialization, inserting and removal routines performed by the plotter 1 during plotting. In steps 151-155 of FIG. 6, the plotter 1 performs standard power on sequences. In steps 157-161, the plotter 1 initializes the pointers, counters and registers 57-125 of RAM 47. In step 163, the plotter 1 creates a single free linked list within the buffer 51 in a well known manner. Starting at the top of the buffer 51, the X, Y and V fields of each vector location are initialized. Each P field is then set to the address of the next vector location as a link and the P field of the last location is set to NIL to indicate the end of the free list. In steps 165, 167 the top free list pointer FLP 55 and the free list end pointer FLE 53 are set to contain the addresses of the first and last locations of the free list.

FIG. 7 is a flow chart of the steps performed by the plotter 1 during insertion of vectors into the buffer 51 and FIG. 8 is a flow chart of the steps performed by the plotter 1 during removal of vectors from the buffer 51 and attendant plotting. Vectors flow into the buffer 51 from the vector generator 31 and computer 33 and concurrently flow out of the buffer 51 to the controller 21 for plotting. Thus, sorting and plotting both begin immediately and continue concurrently until plotting is completed.

In steps 173, 175 of FIG. 7, the sorter 35 interrogates the vector generator 31 for input and determines if the next input is a SELECT PEN command. If the next input is a vector rather than a command, then the sorter 35 assumes that the vector is of the same color as the immediately preceding vector. In step 177, the sorter 35 reads the X,Y information from the incoming vector and stores the information in the X and Y fields of the top free list location as indicated by the FLP 55. In step 179, the V bit of the top location is set as indicated by the V bit of the incoming vector. In steps 181, 183, the appropriate color counter CC is incremented for an updated total number of locations contained in the particular bin. The appropriate tail pointer TP is set to FLP to point to the current location as now being the last location in this particular bin. OLDX 57 and OLDY 59 are set to X and Y to store the most recent vector coordinates. Finally, FLP 55 is set to the next free list location address (from the P field of the current location) to indicate this next location as the new top free list location and the P field of the last location in set to NIL to indicate the end of that color bin. If all of the free list locations have been used, in steps 195, 197 the sorter 35 halts insertion and waits for removal and plotting to occur to create new free list locations.

If, at step 175, the input is a SELECT PEN command, then the sorter 35 determines that a new bin must be created or else a different existing bin must be added to. In step 203, INPEN is set to the new color A-H indicated by the incoming SELECT PEN command. If the CC counter of the new color is zero then a new bin must be created and the new color head pointer HP is set to FLP to point to the top location of the newly created bin. If the incoming V bit indicates up, then normal flow starting at step 177 is entered. If the incoming V bit indicates down, then a potential problem condition exists since the carriage 27 should normally be moved in an up position from the carousel 11 to the starting position of the next vector to be plotted. In steps 211-219, an up vector is created and inserted before the incoming vector.

FIG. 8 shows the steps of the removal routine which are performed by the plotter 1 to remove vectors from the buffer 51 and to plot them onto the sheet 3. Since the routines of FIGS. 7 and 8 operate concurrently, the routine of FIG. 8 may be started at any time that one or more vectors are resident in the buffer 51.

In step 251, the sorter 35 compares the eight color counters CC 111-125 to determine the particular color bin containing the most vectors to be plotted. Once this determination is made, OUTPEN 63 and NEWPEN 65 are set to this color to indicate the color currently being plotted. In step 255, this particular color pen is fetched from the carousel 11 by the carriage 13. The head pointer HP of the particular color A-H is read to determine the top location within the buffer 51 of the desired color bin to be plotted from. The V bit of this top location is read to determine whether the carriage 13 should be raised or lowered and, in step 265, the carriage 13 is moved to the vector X,Y end position indicated by the top location.

In step 267, the location containing the vector just plotted is added to the end of the free list by setting to FLP the P field of the last free list location (as indicated by the free list end pointer FLE 53). In step 269, the FLE 53 is set to the new end location. The appropriate color counter CC is decremented to indicate removal of a vector (and location) from the particular color bin. If this removal leaves the bin empty, then the sorter 35 again determines the fullest bin to plot from. If vectors still remain in the current color bin, then in step 275 the appropriate head pointer HP is advanced to the contents of the P field of the location just plotted and the new location is read in step 257.

The inventors have analyzed typical plotter software applications and have found that the majority of business applications produce between 100 and 1000 vectors between pen changes. Most computer aided design or manufacturing applications produce only between one and 100 vectors between pen changes. Thus, in most such applications pen changes are made more frequently than every 1000 plotted vectors and, as a result, plotting is both inefficient and slow. To demonstrate the advantages of their invention, the inventors performed a typical plot using the plotter 1 without the sorter 35 and measured the total plotting time as 18 minutes and 46 seconds. In contrast, the ploter 1 in conjunction with the sorter 35 made the same plot in 5 minutes, 30 seconds. The inventors also made the same plot using the plotter 1 without the sorter 35 but with the Graftek Company Optplot routine discussed above. Actual plotting with the Optplot routine required only 4 minutes, 30 seconds, but an initial non-plotting sort period of 2 minutes was required for a total plotting time of 6 minutes, 30 seconds.

We claim:

1. A plotter for plotting lines on a sheet in response to commands from a host processor indicating locations and attributes of the lines, the plotter comprising:
generation means, connectable to the host processor, for generating from the commands a string of instructions indicative of the lines to be plotted;
sorter means, coupled to the generation means, for sorting the instructions by line attribute into bins of a memory;
controller means, coupled to the memory, for selecting one selected bin at a time and for presenting instructions stored in the selected bin at an output;
plotting means, coupled to the controller means output for plotting on the sheet with a pen selected in response to the instructions; and
wherein the controller means and the plotting means operate concurrently with receipt of the commands from the host processor and with operation of the generation means and the sorter means so that the plotter is capable of plotting the lines concurrently with receiving the commands from the host processor.

2. A plotter as in claim 1, wherein the string of instructions generated by the generation means includes attirbute designators, destination coordinates and pen lift indicators.

3. A plotter as in claim 2, wherein the sorter means is further operative for receiving an attribute designator and for storing subsequently received destination coordinates and pen lift designators as vectors in a particular bin associated with the received attribute designator.

4. A plotter as in claim 3, wherein the controller means is further operative for selecting the bin containing the most instructions as the selected bin.

5. A plotter as in claim 4, wherein the controller means is further operative for communicating all of the instructions stored in the selected bin to the plotting means before selecting another bin.

6. A plotter as in claim 5, wherein:
the memory comprises a random access memory; and
each bin comprises a linked list.

7. A plotter as in claim 6, wherein:
the plotting means is further operative for selecting the selected pen from one or more possible pens; and
the plotting means is further operative for raising and lowering the selected pen and for moving the selected pen relative to the sheet.

8. A plotter as in claim 7, wherein the possible pens are contained in a carousel which is accessible to the plotting means.

9. A plotter as in claim 7, wherein the attribute is color.

10. A plotter as in claim 5, wherein the attribute is color.

11. A plotter as in claim 3, wherein the attribute is color.

12. A plotter as in claim 1, wherein the attribute is color.

13. A method for plotting lines on a sheet in response to commands from a host processor indicating locations and attributes of the lines, the method comprising the steps of:
receiving the commands from the host processor and generating a string of instructions indicative of the lines to be plotted;
sorting the instructions by attribute;
storing the instructions by attribute in bins of a memory;
selecting a bin;
plotting on the sheet in response to instructions contained in the selected bin; and
wherein the steps of sorting, storing, selecting and plotting are performed concurrently with the steps of receiving and generating.

14. A method as in claim 13, wherein the step of selecting comprises selecting that bin having the most instructions.

15. A method as in claim 14, wherein the step of plotting comprises:
plotting on the sheet in response to all of the instructions contained in the selected bin; and
repeating the steps of selecting and plotting.

16. A method as in claim 15, wherein:

the step of sorting comprises the step of sorting the instructions by color; and the step of storing comprises the step of storing the instructions by attribute in bins of a memory.

17. A method as in claim 14, wherein:

the step of sorting comprises the step of sorting the instructions by color; and the step of storing comprises the step of storing the instructions by attribute in bins of a memory.

18. A method as in claim 13, wherein:

the step of sorting comprises the step of sorting the instructions by color; and the step of storing comprises the step of storing the instructions by attribute in bins of a memory.

* * * * *